Sept. 6, 1960  J. E. CANDLIN, JR  2,951,454
VEHICLE FOLDING STEP ASSEMBLY
Filed April 8, 1957  3 Sheets-Sheet 3
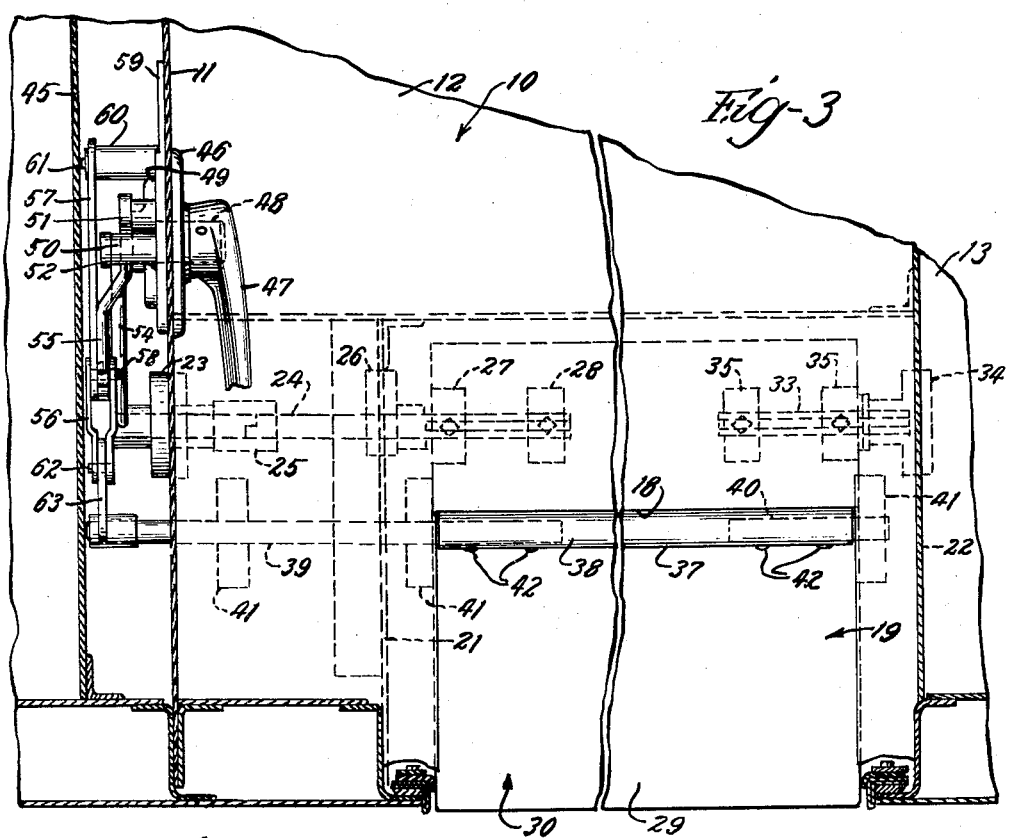
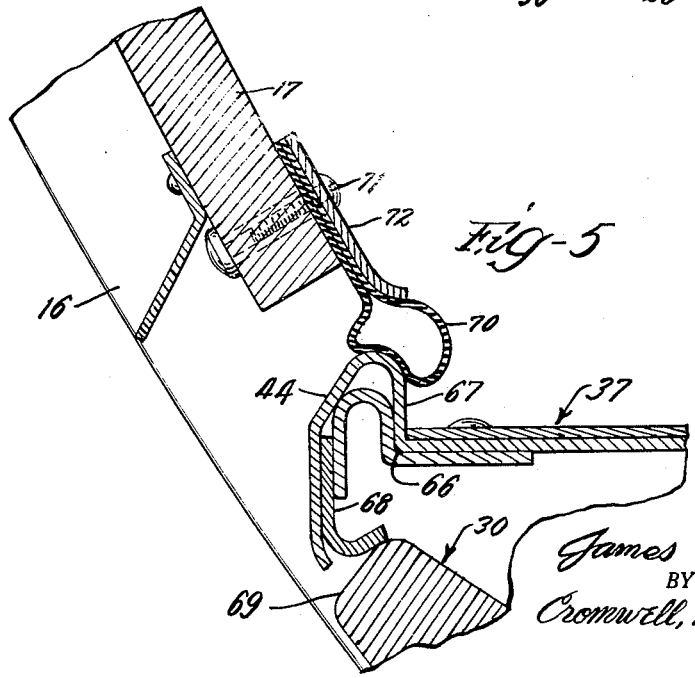
INVENTOR.
James E. Candlin Jr.
BY
Cromwell, Greist & Warden
Attys.

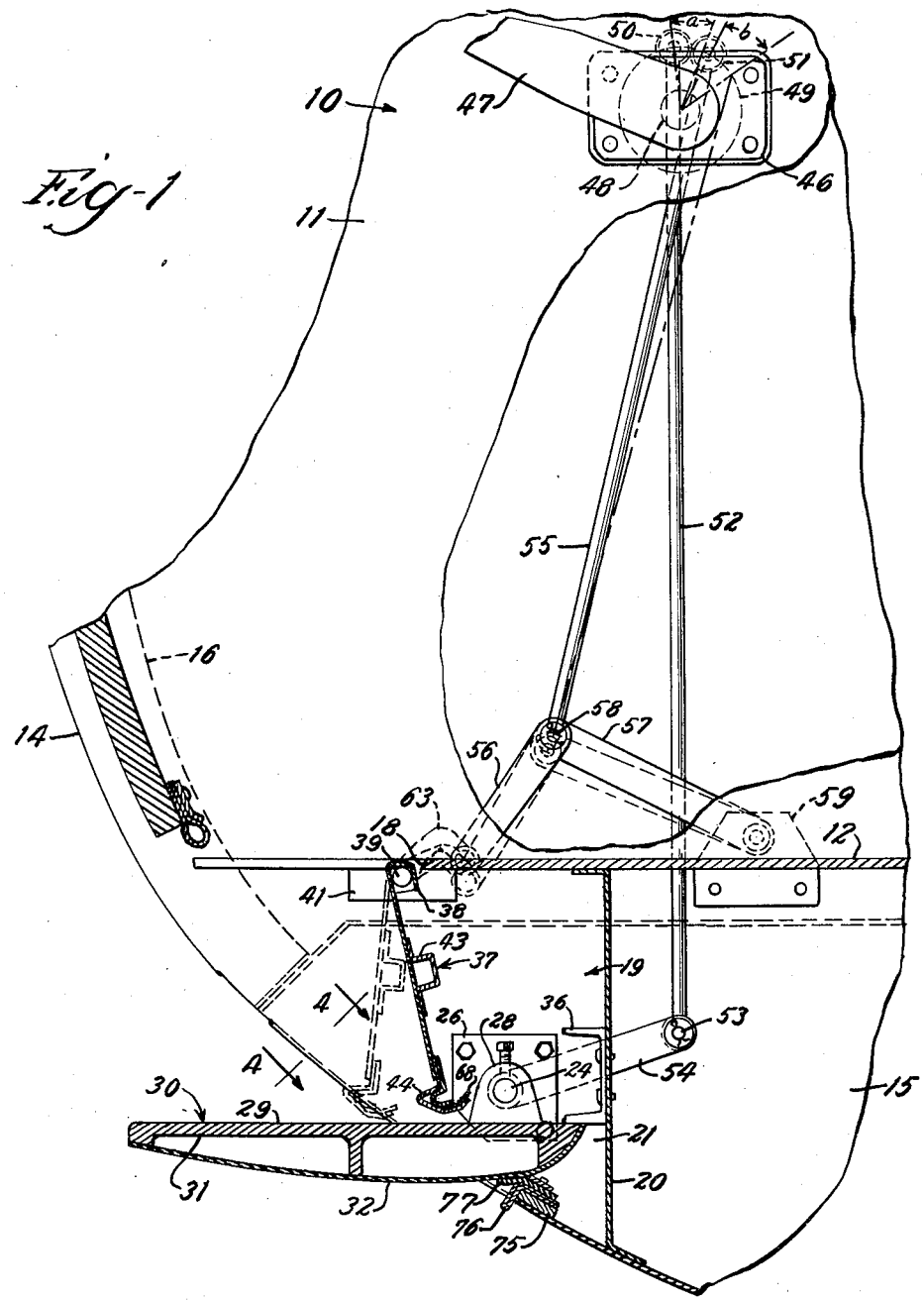

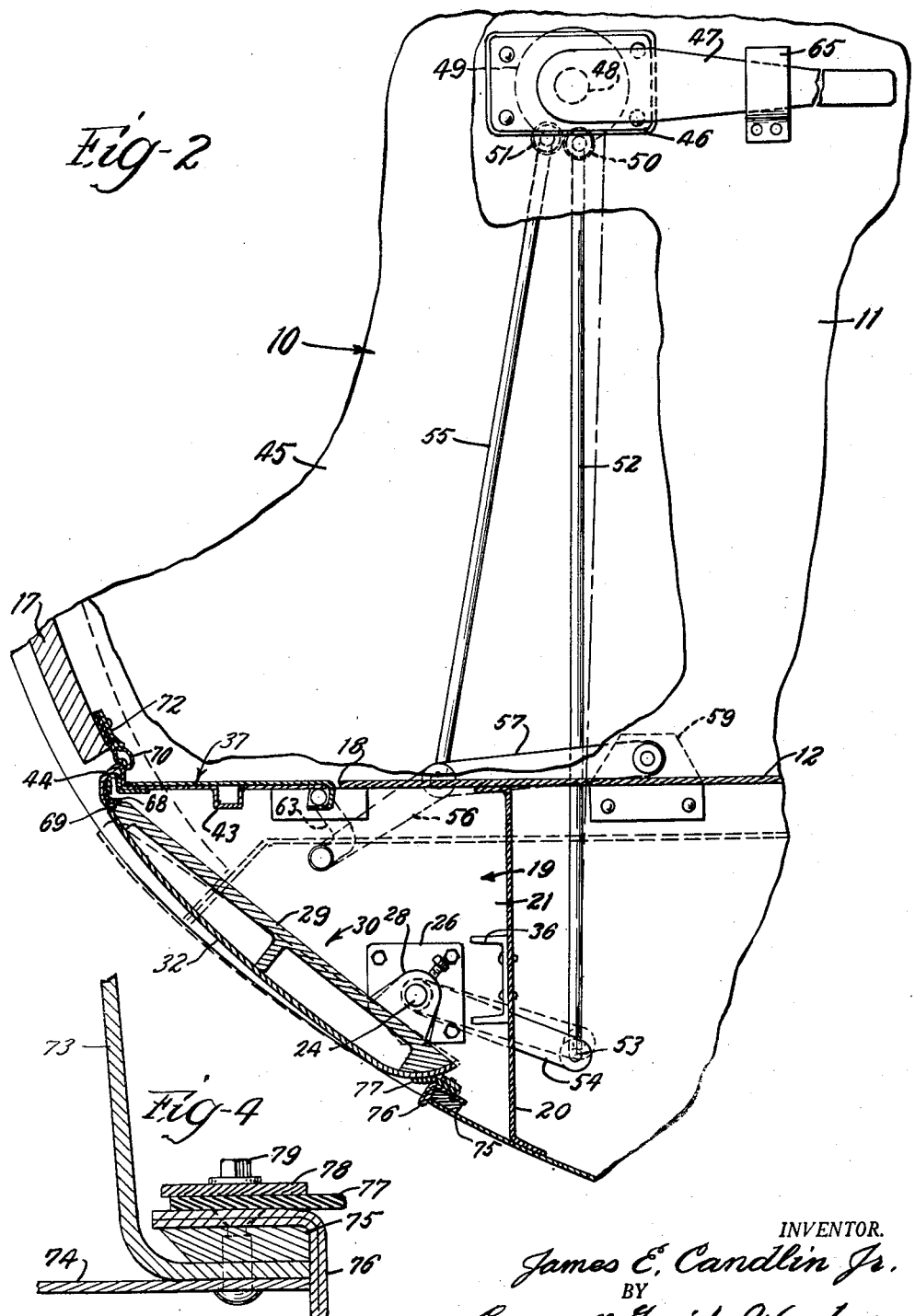

United States Patent Office 2,951,454
Patented Sept. 6, 1960

2,951,454

VEHICLE FOLDING STEP ASSEMBLY

James E. Candlin, Jr., Lansing, Ill., assignor to Pullman-Standard Car Manufacturing Company, Chicago, Ill., a corporation of Delaware Filed Apr. 8, 1957, Ser. No. 651,370

5 Claims. (Cl. 105—447)

The present invention is directed to a new and improved mechanically operated folding step assembly for use in a vehicle door structure to provide a step arrangement below a hingedly mounted door. More specifically, the present invention is directed to a new and improved folding step assembly for mounting in the step well of a vehicle body below a hingedly mounted door and an interrupted vehicle floor to provide a step-down arrangement when the step assembly is in its opened position, the step assembly being formed from mechanically operated step structure and step riser elements which are separately movable into and out of open and closed positions to provide new and improved functioning with one another in cooperating relation both with the door and vehicle floor.

With particular reference to railway cars of the passenger-carrying type, the need for an improved form of step assembly carried in the step well forming a part of a door structure has long been recognized. In conventional designs, the vestibule of a railway car is provided with a permanently fixed set of steps which extend downwardly from the car floor within a step well which extends inwardly from the door structure carried in the side frame of the car. The permanently fixed steps do not protrude outwardly of the side frame or door structure of the car in order to prevent damaging contact with structures mounted along the side of the roadbed in close proximity thereto. The door itself is relatively short so that the bottom edge of the same can clear the top surface of the floor to allow the door to be moved into its open position inwardly of the car vestibule. In order to prevent passengers from falling into the step well when the door is closed, a hingedly mounted trap door is provided which in its dropped position covers and completely encloses the top of the step well, the bottom edge of the door being movable over the top surface of the trap door.

With the conventional arrangement described, it is extremely difficult to establish and maintain a proper weather sealing arrangement between the bottom surface of the door and the top surface of the trap door when these elements are in their closed positions. A strip of sealing material fastened to the bottom surface of the door for engagement with the top surface of the trap door does not retain its sealing efficiency over protracted periods of use due to the continuous wear caused by frictional sliding of the strip over the top surface of the trap door. The cost and time involved in continuously replacing weather sealing strips along the bottom surface of the doors has been found prohibitive in line with preferred, substantially continuous use of the equipment. Still further, with the trap door arrangement the outer edge of the same extends slightly outwardly of the outer surface of the door in accordance with conventional design and this outer edge thus provides a slip which collects water which, in turn, flows under the door into the vestibule.

In addition to the foregoing disadvantages of the trap door design, unless specially designed retractable means are provided for covering the permanently fixed steps, ice can readily form on the same during cold weather operation of the car and the steps are thus rendered dangerous for use by the passengers. Complicated mechanical shielding arrangements have been proposed and used in certain instances to protect the steps, but these arrangements have been found to be not only costly but incapable of use under variable platform positioning conditions such as encountered when the railway car is operated through a number of differently constructed passenger terminals or stations. Unprotected steps can also collect refuse or dirt thus further either interfering with the use of the same or increasing maintenance thereof.

With the projecting of the outer edge portion of the trap door beyond the outer surface of the door, an additional problem of ice formation thereon interferes with efficient opening and closing of the door or trap door. No special means are provided for initially breaking a coating of ice and under certain circumstances substantial physical effort is necessary to open the door or trap door. In addition to the foregoing problem, it will be readily appreciated that opening and closing of the door and trap door requires substantial time and effort on the part of the operator. The time involved in opening and closing this particular arrangement can affect the scheduling of a train particularly where numerous stops are made throughout a specified run. In operating this type of arrangement, it is essential that the door be opened first before the trap door can be raised. Also, during the closing operation, it is necessary to first drop the trap door before closing the side door.

It is an object of the present invention to provide a new and improved folding step assembly for mounting in a door structure of a vehicle body, the assembly including separate elements defining a step structure and step riser each of which are separately movable into and out of open and closed positions by mechanical actuating means, the assembly in its open position being contained within the widest dimension of the vehicle, the assembly in its closed position having the step structure thereof in a fully protected position without interfering with full use of the floor area immediately surrounding the door structure, the step riser element thereof being positioned to completely enclose the top of the step well associated with the door structure and extend the vehicle floor immediately up to the door hingedly carried in the door structure.

A further object is to provide a new and improved folding step assembly particularly adapted for use in a vehicle body of tubular outline, the door assembly being mounted in a step well located below a hingedly mounted door, the assembly including step structure and step riser elements which are mechanically movable relative to one another into and out of open and closed position, the step structure in its closed position being fully protected from the elements and the depositing of refuse and the like thereon and further completely closing off the outer surface of the step well immediately below the door member to provide a completely closed outer vehicle surface of continuous contour to eliminate the trapping of water which eventually might flow into the interior of the vehicle through the door structure, the step riser element in its closed position providing an extension of the vehicle floor to close off the top of the step well and provide a weight supporting continuous surface extending immediately up to the door structure.

Still a further object is to provide a folding step assembly of the type described in the foregoing objects wherein flexible weather sealing strips are carried by the door structure for engagement with the step structure to prevent freezing of the step structure in its closed position to an extent that additional exertion is necessary in order to free the step structure for movement into its open position, and wherein the step riser element is provided with a free and movable margin which in the closed position of the assembly is located between the step structure and bottom edge of the door, the free margin of the step riser carrying a flexible sealing strip for engagement with the step structure and being further provided with a surface for engagement with the bottom edge of the door for cooperation with a sealing strip positioned therebetween and further allows opening and closing of the door with or without mechanical operation of the step assembly.

Another object taken in conjunction with the last mentioned object, is to provide a folding step assembly mechanically operated by an actuating means which moves the step riser element into its closed position at a faster initial rate than the movement of the step structure into its closed position so as to prevent interference between the same and establish proper positioning of the free margin of the step riser element prior to sealing engagement thereof with the step structure, the actuating means further including a toggle locking arrangement for rigidly locking the step riser element in its closed vehicle floor extending position with the minimum of effort.

Other objects not specifically set forth will become apparent from the following detailed description made in conjunction with the drawings wherein:

Fig. 1 is a fragmentary, partly sectioned side elevation of the folding step assembly and actuating means of the present invention, the assembly and actuating mechanism being illustrated as mounted in the vestibule of a railway car of tubular outline;

Fig. 2 is a view similar to Fig. 1 illustrating the assembly in its closed position;

Fig. 3 is a fragmentary, partly sectioned, plan view of the vehicle vestibule and step assembly mounted therein;

Fig. 4 is an enlarged sectional view of the sealing strip mounting arrangement taken generally along line 4—4 of Fig. 1; and Fig. 5 is an enlarged fragmentary elevational view of the door and step riser sealing arrangement when the same are in their closed positions.

The following detailed description of the folding step assembly of the present invention is directed to its use in a known type of railway car having a tubular body outline. Passenger-carrying railway cars of this type are well known insofar as the body structure thereof is concerned. Consequently, the following description deals solely with the structural features of the folding step assembly and the manner in which it cooperates with certain elements of the door structure and vestibule of a tubular railway car of known design. While the detailed description of the present invention is limited to the mounting and use of the folding step assembly in the side doorway structure of a vestibule of a conventional form of tubular railway car, it should be understood that the embodiment disclosed is merely illustrative of one form of use. For example, any tubular vehicle body provided with a doorway structure may be improved by the use of the folding step assembly of the present invention where it is desired to provide mechanically actuated step forming elements such as for a step-down arrangement from the floor level of the vehicle through the door structure onto a platform or unloading area, as, for example, movable stairs used for unloading passengers from aircraft.

Referring particularly to Figs. 1-3, a vestibule portion 10 is partially illustrated, this portion as particularly shown in Fig. 3 being defined by a vertically directed body end sheet 11, a permanent floor 12 and a car end structure 13. The railway car is provided with a tubular outline defined by its side frame construction 14 and its underframe construction 15, only portions of which are illustrated. The side frame construction adjacent the vestibule 10 is provided with a curved door structure 16 having hingedly mounted therein a conventional form of curved door 17, the bottom portion of which is shown in the drawings. The door 17 may be of any suitable design being hingedly mounted for opening inwardly into the vestibule in the known manner.

The vestibule floor 12 is terminated substantially inwardly of the door structure 16 and a free edge 18 thereof defines the innermost margin of a step well 19 which is of a width substantially equal to the width of the door structure 16. A vertically directed floor support 20 defines the innermost vertical margin of the step well 19 and the curved outer surface of the underframe construction 15 completes the definition of the step well area. As particularly shown in Fig. 3, the transverse sides of the step well 19 are defined by a vertically directed floor supporting plate 21 located near the body end sheet 11 and a vestibule end sheet 22 forming a part of the car end structure 13.

Below the level of the floor 12 a pin bearing collar and sleeve assembly 23 is mounted in the body end sheet 11 and has extending therethrough a step structure operating pin 24 which is in the form of a split shaft having interlocking ends thereof joined by a sleeve coupling 25. The pin 24 is further journalled through the plate 21 by a suitable collar and sleeve housing 26 and is fixedly attached by bearing brackets 27 and 28 to the top surface 29 of a step structure 30.

The step structure 30 is formed from a cast plate 31 provided with spaced, downwardly directed ribs to which is attached a convex cover sheet 32 formed from the same metallic material as the cover sheet of the side frame construction 14 and the underframe construction 15. The step 30 is pivotally mounted in the step well 19 by the pin 24 previously described, and as shown in Fig. 3, a second pin 33 extends from a substructure fulcrum element 34 carried by the vestibule end sheet 22. Sleeve bearings 35 attach the pin 33 to the top surface 29 of the step structure 30. From the positions of the pins 24 and 33, it will be particularly noted that the step structure 30 is mounted toward the rear edge thereof for pivotal movement within the step well 19. Rotating actuating forces are applied to the pin 24 through an actuating mechanism and the pin 33 functions as an idler to support one side portion of the step structure 30 while allowing the step to pivot relative to the fulcrum element 34.

The particular structural elements described in connection with the pivotal mounting of the step structure 30 within the step well 19 provide the sole means for supporting the same therein. With use of this mounting arrangement, the step structure is in the form of a cantilever, the operational weight being applied to the forward portion of the step structure when the same is in its open position as shown in Figs. 1 and 3. To further support the step structure 30 in its open position, an abutment stop means in the form of a channel stop and stiffener element 36 is mounted on the plate 20 at the rear of the step well 19 and is arranged for abutment with the rearmost edge of the top surface 29 of the step structure 30. Thus, in its open position as particularly shown in Fig. 1, the step is not only supported by the pins 24 and 33, but additional strength is imparted thereto by abutment with the channel stop 36.

The folding step assembly further includes a pivotally mounted step riser 37 which generally is in the form of a flat plate provided with a sleeve-like bearing portion 38 along one edge thereof which receives therein a pin 39 suitably supported and journalled through the body end sheet 11 and vertical plate 21. The opposite end of the sleeve bearing 38 has received therein another pin 40 which functions as a supporting idler pin. The pins 39 and 40 are suitably journalled in bearings 41 which are attached to the undersurface of the floor 12. The end portions of the pins 39 and 40 received in the sleeve 38 are fixed by fastening means 42 against rotation therein and upon suitable rotation of the pin 39 in the manner to be described, the step riser 37 is moved into and out of its open and closed positions.

As shown in Figs. 1 and 2, the flat plate defining the step riser 37 is strengthened by a generally U-shaped member 43 attached to the bottom surface thereof to allow the plate to safely support loads when the step riser 37 is moved into its closed position and completely closes off the top area of the step well 19. As particularly illustrated in Figs. 1 and 2, the sleeve end 38 of the step riser 37 is pivotally mounted adjacent the free edge 18 of the floor 12. With the pivotal mounting of one edge of the step riser 37, the same is provided with a freely movable opposite edge or margin which carries a nose element 44.

With the pivotal mounting of the step structure 30 and step riser 37 having been described, the mechanical assembly actuating means carried between the body end sheet 11 and an interior end sheet 45 forms an important part of the present invention by providing for controlled relative movement of the step structure and step riser into and out of open and closed positions. Referring to Figs. 1–3, the body end sheet 11 carries a face plate 46 having an opening handle 47 suitably fixed to a rotatable pin 48 extending through the face plate 46 into fixed engagement with a rotatable disk or cam 49. The disk 49 carries radially outwardly projecting sleeves 50 and 51 which are closely positioned relative to one another and which are integrally formed with the disk 49. Pivotally attached to the outer end of the sleeve 50 by a suitable pin is a downwardly extending step structure actuating rod 52 which at its lowermost end is pivotally attached by a pin 53 to a lever 54. The opposite end of the lever 54 is fixedly attached to the pin 24 to rotate the same and the attached step structure 30 upon movement of the rod 52 as a result of rotation of the disk 49.

Pivotally attached to the sleeve 51 is a step riser actuating rod 55 which extends downwardly and is pivotally attached at its opposite end with a step riser link 56 and a step riser fulcrum link 57. The step riser 56 is in the form of a double ended clevis as shown in Fig. 3 and the bifurcated end of the same pivotally attached to the rod 55 also receives an end of the step riser fulcrum link 57 therebetween, all of these elements being interconnected by a single cotter pin 58. The opposite end of the step riser fulcrum link is pivotally connected to a fulcrum plate 59 carried by the body end sheet 11 and provided with an integral sleeve 60 to which the link 57 is pivotally attached at the outer end thereof by a pin 61. The opposite bifurcated end of the step riser link 56 is pivotally attached by a cotter pin 62 to a substantially J-shaped step riser lever 63 which at its opposite end is fixedly attached to the pin 39 to rotate the same and the step riser 37 upon movement of the rod 55 in response to rotation of the disk 49.

Referring particularly to Fig. 1 wherein the step assembly is shown in its open position with the top surface 29 of the step structure 30 extending outwardly from the step well 19 and in substantially vertically spaced, parallel relation with the floor 12, the step riser 37 is directed downwardly toward the top surface of the step structure 30 and extends slightly rearwardly in inclined relation to at least substantially completely enclose the vertical area between the floor 12 and step structure 30. The handle 47 is in its open position and the sleeves 50 and 51 of the disk 49 are positioned at substantially the top portion of travel of the circumference of the disk 49. To close the step structure by moving the elements thereof into the positions shown in solid lines in Fig. 2, the handle 47 is rotated clockwise as viewed in Fig. 1 and the pin 48 causes the disk 49 to rotate at the rear of the face plate 46. The pivot points of the rods 52 and 55 at their attachments to the sleeves 50 and 51 travel the same circumferential path which is substantially spaced from the center of rotation of the disk 49. Consequently, relatively slight movement of the lever 47 causes the sleeves 50 and 51 to move a greater distance to actuate the folding step assembly.

In the initial part of the closing operation of the step assembly, it is necessary to rotate the step riser 37 in a clockwise direction, as viewed in Fig. 1, a substantial distance as compared with the clockwise rotation of the step structure 30. This is necessary in order to bring the nose element 44 of the step riser 37 upwardly a sufficient distance to prevent contact between the nose element and the step structure 30 when the latter begins to rotate clockwise. To accomplish this initial greater movement of the step riser as compared with the initial movement of the step structure, the sleeves 50 and 51 are arranged as illustrated with the step riser actuating sleeve 51 in advance of the step structure actuating sleeve 50 insofar as the direction of rotation of the disk 49 is concerned during the step closing operation. With clockwise rotation of the disk 49, the foremost sleeve 51 begins to move downwardly to a greater extent than the sleeve 50 which initially travels across the top portion of the circumference of its path of rotation. With the sleeve 51 entering the downward portion of the circumferential path of rotation of the disk 49, the step riser actuating rod 55 will move downwardly to a greater extent than the step structure actuating rod 52. In this respect, the angles $a$ and $b$ in Fig. 1 illustrate equal angular rotation of the sleeves 50 and 51 during initial movement of the lever 47. Each of these angles is, of course, equal because of the fixed relative positioning of the sleeves 50 and 51. However, due to the locations of the sleeves 50 and 51 during rotation of the disk 49, the angle $b$ of movement of the sleeve 51 causes substantially more downward movement of the rod 55 and, consequently, substantially more pivotal motion is transmitted to the step riser 37. The rod 52 moves only a relatively slight amount in a downward direction thus transmitting to the step structure 30 a very slight degree of clockwise rotation.

To emphasize the difference in initial rotation of the step riser 37 as compared with that of the step structure 30, the translated positions of the various links and levers connecting the rod 55 to the step riser 37 are shown in broken lines in Fig. 1. The very slight movement of the step structure 30 and its actuating rod and lever is not illustrated in Fig. 1, it being understood that very little actuation of the step structure 30 occurs during movement of the sleeve 50 through the angle $a$. Once the degree of rotation of the disk 49 as measured by the angles $a$ and $b$ is completed, the actuating mechanism provides for substantially equal pivotal movement of both the step riser 37 and the step structure 30. The important feature is that once substantially equal movement has been attained, the step riser 37 has completely cleared the top surface 29 of the step structure 30 and contact between these elements does not occur.

Continued movement of the handle 47 and rotation of the disk 49 causes the step riser 37 to move into substantially coplanar relation with the floor 12 in its closed position as shown in Fig. 2 and the step structure 30 to move up into substantially planar relation with the outer surface of the door 17 in its closed position. With the step riser 37 pivoted into a horizontal plane, the floor 12 is in effect extended immediately up to the door 17 and the top opening in the step well 19 is completely closed. Thus, a continuous floor in the vestibule 10 is provided, the step riser 37 being capable of supporting loads of the same magnitude as the floor 12. The step structure 30 completely closes off the outer bottom portion of the step well 19 and provides a completely smooth outer surface to the railway car eliminating the projection of any step elements, such as a trap door, outwardly of the contour of the car.

The actuating mechanism as a result of the relative positioning of the sleeves 50 and 51 provides for movement of the step riser 37 into its closed position just prior to complete closing of the step structure 30. As previously described, the step riser 37 is pivoted a substantial amount prior to any substantial pivotal movement of the step structure 30 and, consequently, the step riser 37 reaches its closed position prior to complete closing of the step structure 30. This particular feature is illustrated in Fig. 2 wherein the positioning of the step structure 30 is shown in broken lines just prior to complete closing of the same and immediately following the complete closing of the step riser 37. Consequently, the nose element 44 of the step riser 37 is brought into sealing engagement with the bottom surface of the door 17 just immediately prior to complete closing of the step structure 30. With this operating arrangement the nose element 44 is initially positioned for subsequent sealing engagement with the forward end of the step structure 30 as will be described.

In the closed position of the step assembly as shown in Fig. 2, the sleeve 51 to which the step riser actuating rod 55 is pivotally attached has moved past the vertical axis of the disk 49 in a clockwise direction. Thus, the sleeve 51 is positioned past dead center relation relative to the vertical and has slightly commenced upward movement along its circumferential path of rotation. The handle 47 is received in a movement limiting or locking bracket 65 suitably attached to the outer surface of the body end sheet 11 and arranged to prevent further clockwise rotation of the disk 49 past the closed position of the step assembly. The locking bracket 65 is merely illustrative of any suitable means which may be employed to prevent further rotation of the disk 49, it being understood that abutment stop means integrally formed with certain of the elements forming the step assembly actuating mechanism may be used if desired. The pivotal interconnections of the step riser actuating rod 55, step riser link 56 and step riser fulcrum link 57 provides a toggle lock arrangement which in combination with the final positioning of the sleeve 51 prevents counterclockwise pivotal movement of the step riser 37 and step structure 30 out of their closed position unless the handle 47 is purposely moved in a counterclockwise direction. The use of the toggle lock arrangement in combination with the final closed position of the sleeve 51 not only prevents inadvertent opening of the step assembly but further strengthens the step riser 37 to allow the same to carry substantial weight. Very little effort is needed to unlock the step assembly as it is necessary merely to grasp the handle 47 and move the same in a counterclockwise direction. Thus, an uncomplicated, readily and efficiently functioning locking arrangement is provided to prevent inadvertent opening of the step assembly.

It will be readily appreciated that upon opening the step assembly into the position shown in Fig. 1, the closing operation described above is reversed and it is necessary merely to move the handle 47 in a counterclockwise direction. The abutment plate 36 functions not only to further strengthen the cantilevered step structure 30 but also prevents continued movement of the handle 47 beyond the completely open position. Thus, upon abutment between the rear edge of the step structure 30 and the abutment plate 36, the sleeves 50 and 51 are positioned along their circumferential path of travel in order to properly function during a subsequent closing operation to bring the step riser 37 out of possible engagement with the step structure 30 as previously described.

In Fig. 5, the nose element 44 of the step riser 37 is more clearly illustrated insofar as its structural features are concerned and its sealing cooperation with the door 17 and the step structure 30. The nose element 44 is formed from a hook-shaped plate 66 combined with a larger hook-shaped plate 67 both of which are suitably attached to the free margin of the flat plate forming the step riser 37. The ends of the plates 66 and 67 suitably clamp therebetween a flexible sealing strip 68 of rubber or rubber-like material which extends outwardly from the ends of the plates a substantial distance for flexible, inclined sealing engagement with the outer edge 69 of the step structure 30. The uppermost curved portion of the plate 67 is in flexing engagement with a folded flexible sealing strip 70 of tubular shape which is suitably attached to the bottom portion of the door 17 by fastening means 71 extending through a rigid backing or holding plate 72. With the arrangement illustrated, the door 17 may be opened or closed regardless of the position of the step riser 37. Consequently, there is no set sequence of operation necessary in either opening or closing the door and step assembly during use of the railway car. The material of the sealing strips 68 and 70 are of sufficient flexibility to allow ready and easy separation of the door 17 and step structure 30 from contact with the step riser 37.

In cold weather operation a continuous coating of ice often forms on the outer surface of the railway car completely covering and contacting all exposed surface portions. In the event that a coating of ice completely covers all of the combined elements illustrated in Fig. 5, the resilient flexibility of the sealing strips used allows for ready separation of the various movable elements. An opening force applied to the door 17 will result in a flexing of the sealing strip 70 and the breaking of the ice coating thus allowing ready separation of the strip 70 from contact with the nose element 44. Likewise, movement of the handle 47 of the step assembly actuating mechanism toward the open position will cause the step structure 30 to move outwardly against the sealing strip 68 to flex the same and break the coating of ice completely covering the contacting surfaces. As previously described, the final closing movement of the elements constituting the step assembly is that in which the step structure 30 moves into closed position following complete closed positioning of the step riser 37. Consequently, upon opening of the step assembly the initial operation of the actuating mechanism results in a slight opening movement of the step structure 30 prior to any movement of the step riser 37.

To complete the weather sealing of the lower portion of the door structure 16 defining the outer opening of the step well 19 and the framework for the step structure 30, a sealing strip mounting arrangement, such as shown in Fig. 4, is used in connection with the rear end surface of the step structure 30 as well as the side surfaces thereof. The door structure 16 is formed with a frame 73 to the outer flanged portion of which is attached a side or bottom sheet 74 of the car. A spacer plate 75 is mounted on the inner surface of the flanged end portion of the frame 73 and a reversely folded trim plate 76 is suitably attached thereto. The inner surface of the trim plate 76 carries a flexible sealing strip 77 an edge of which projects substantially outwardly thereof for engagement with a side surface of the step structure 30. The positioning of the sealing strip is shown in Fig. 1. The strip 77 is held in place by a holding plate 78 and suitable fastening means 79. A similar arrangement is used to seal the rear or lowermost edge of the step structure 30 as shown in Figs. 1 and 2. The side and rear edge sealing strips are of sufficient inherent flexibility to provide an ice breaking function when the step assembly is actuated to move into its open position as previously described.

By using the folding step assembly of the present invention, the step structure itself serves an additional function of completely closing off the outwardly opening portion of the step well and providing a smooth and continuous outer tubular surface to the car. No mechanical elements project outwardly of the outline of the car body and means are provided whereby a continuous coating of ice can be readily broken in order to open the step assembly with the minimum of effort. Refuse cannot collect in the step well when the step assembly is in its closed position. The door may be opened regardless of the relative positions of the various elements forming the step assembly and no special sequence of operation is necessary in order to make full use of the door and step structure. The mounting of the step structure in the step well is arranged so that the free movable forward edge of the same does not extend out beyond the outermost portion of the side frame construction of the car to protect the step from striking obstacles close to the roadbed in the event that the assembly is left in its open position during operation of the car. The assembly actuating mechanism as previously described is readily operated to bring the step assembly into and out of open and closed positions. The locking arrangement including the toggle connection provides adequate support to the step riser and eliminates the necessity of providing separately operated locks or supports to allow full use of the entire floor area of the vestibule when the step assembly is in its closed position.

Obviously many modifications and variations of the invention as hereinbefore set forth may be made without departing from the spirit and scope thereof, and therefore only such limitations should be imposed as are indicated in the appended claims.

I claim:

1. In a vehicle body of tubular outline provided with a doorway structure including a hingedly carried door and a step well defined by an opening in the vehicle below said door and below the vehicle floor with said vehicle floor terminating substantially inwardly of said door, the provision of a folding step assembly mounted in said step well, said assembly including a step structure pivotally mounted to said vehicle below the level of said floor and adjacent the outer surface of said vehicle body with the bottom surface of said step structure being convex and providing a closure for said opening below said door and floor in its closed position, a step riser pivotally mounted to said vehicle at the free terminating edge of said floor above said step structure, said step riser constituting an extension of said floor from said edge thereof to said door in its closed position, sealing means carried along the adjacent edges of said door and step riser and in engagement therebetween and with the adjacent edge of said step structure to fully close off and seal the areas of juncture therebetween, the adjacent edges of said step structure and step riser being located below the adjacent edge of said door to permit opening and closing of said door with said step structure and step riser in closed positions, the pivotal mounting of both said step structure and step riser being provided by means including a connection to an operating means to pivot said step structure and step riser into open positions to place said step structure in a horizontal plane below said door and floor and said step riser in a vertical plane extending between the terminating edge of said floor and said step structure.

2. The folding step assembly of claim 1 wherein said sealing means includes a flexible sealing strip mounted along the bottom edge of said door in engagement with the adjacent edge of said step riser, and a further flexible sealing strip mounted along the outer edge of said step riser in engagement with the adjacent edge of said step structure.

3. The folding step assembly of claim 1 wherein said operating means includes a single actuating means including a rotatable member in the form of a disc having pivotally attached thereto at a point spaced from its center of rotation a first rod which is attached through a lever fixed at one end to said step structure to pivot the same upon rotation of said rotatable member, a second rod pivotally attached to said rotatable member at a point spaced from the center of rotation thereof and closely positioned to the point at which said first rod is pivotally attached to said rotatable member, said second rod being further attached through a lever linkage arrangement to said step riser to pivot the same upon rotation of said rotatable member, the relative location of said points of pivotal attachment of said rods to said rotatable member providing for greater initial pivotal movement of said step riser from the open position of said assembly to clear the free margin thereof relative to said step structure and bring said free margin into closed position prior to complete closing of said step structure.

4. The folding step assembly of claim 1 wherein said operating means includes a single actuating means including a rotatable member in the form of a disc having pivotally attached thereto at a point spaced from its center of rotation a first rod which is attached through a lever fixed at one end to said step structure to pivot the same upon rotation of said rotatable member, a second rod pivotally attached to said rotatable member at a point spaced from the center of rotation thereof and closely positioned to the point at which said first rod is pivotally attached to said rotatable member, said second rod being further attached through a lever linkage arrangement to said step riser to pivot the same upon rotation of said rotatable member, the relative location of said points of pivotal attachment of said rods to said rotatable member providing for greater initial pivotal movement of said step riser from the open position of said assembly to clear the free margin thereof relative to said step structure and bring said free margin into closed position prior to complete closing of said step structure, said lever linkage arrangement comprising a toggle joint having a toggle locking pivotal connection with said second rod to lock said step riser in closed position.

5. The folding step assembly of claim 4 wherein said sealing means includes a flexible sealing strip mounted along the bottom edge of said door in engagement with the adjacent edge of said step riser, and a further flexible sealing strip mounted along the outer edge of said step riser in engagement with the adjacent edge of said step structure.

References Cited in the file of this patent

UNITED STATES PATENTS

| | | |
|---|---|---|
| 2,146,668 | Baade | Feb. 7, 1939 |
| 2,220,035 | Brack | Oct. 29, 1940 |